United States Patent [19]

Malakhoff

[11] Patent Number: 4,479,378
[45] Date of Patent: Oct. 30, 1984

[54] METHOD AND SYSTEM FOR DETERMINING EFFECT OF UNDERWATER EXPLOSION ON SUBMERGED STRUCTURES

[75] Inventor: Alexander Malakhoff, Arlington, Va.

[73] Assignee: The United States of America as represented by the Secretary of the Navy, Washington, D.C.

[21] Appl. No.: 422,409

[22] Filed: Sep. 23, 1982

[51] Int. Cl.³ ..................... G01N 33/22; G01M 10/00
[52] U.S. Cl. .......................................... 73/12; 73/35;
73/432 R; 73/432 SD; 73/148
[58] Field of Search .............. 73/12, 148, 35, 432 SD,
73/432 J, 432 V, 432 R

[56] References Cited

U.S. PATENT DOCUMENTS

| | | | |
|---|---|---|---|
| 1,309,728 | 7/1919 | Grieshaber | 73/148 |
| 1,309,736 | 7/1919 | Hibbs et al. | 73/148 |
| 2,754,677 | 7/1956 | New | 73/37 |
| 2,957,337 | 10/1960 | Choate et al. | 73/12 |
| 3,085,422 | 4/1965 | Monroe et al. | 73/12 |
| 3,196,677 | 7/1965 | Day et al. | 73/148 |
| 3,453,879 | 7/1969 | Chamberlin et al. | 73/148 |
| 3,613,435 | 10/1971 | Anderson | 73/37 |
| 3,729,980 | 5/1973 | Johnson et al. | 73/12 |
| 3,972,223 | 8/1976 | Torghele | 73/12 |

FOREIGN PATENT DOCUMENTS 847153 7/1981 U.S.S.R. .......................... 73/12

OTHER PUBLICATIONS

The Naval Ship Research & Development Center, Report 3039, Nov. 1971, Captain Mida C. Vincent, USN, pp. 21-23, 25-27, 43, 44, 53 and 54.

Primary Examiner—S. Clement Swisher
Assistant Examiner—Tom Noland
Attorney, Agent, or Firm—R. F. Beers; L. A. Marsh

[57] ABSTRACT

A method and system for experimentally determining response characteristics and strength capacity of submerged hull structures subjected to underwater explosion. This method and system allows testing in relatively shallow water, near the shore and in close vicinity of data recording and process equipment. Moreover, the test item is more accessible for inspection and modification/s, as necessary. This method and system also allow a more controlled environment independent of waves and weather.

3 Claims, 2 Drawing Figures

METHOD AND SYSTEM FOR DETERMINING EFFECT OF UNDERWATER EXPLOSION ON SUBMERGED STRUCTURES

BACKGROUND OF THE INVENTION

1. Field of the Invention

This invention relates to a method and a system for experimentally determining response characteristics and strength capacity of submerged hull structures subjected to underwater explosion. One example is the submarine hull structure. Another is the research and rescue type underwater hull structure.

The conventional method and system for determining the submerged pressure hull structure behavior under explosive loads is to physically submerge the test hull structure to the desired depth in water and place and explode the explosive at a given stand-off distance. This method and system requires a test site which has a sufficient water depth, and then towing the test hull structure/s, instrumentation, and data processing equipment to the test site location. Raising and lowering the test hull structure and the explosive charge is time consuming, thus costly. Further, carefully laid out test plans can be disrupted by wave and/or weather condition.

2. Description of the Prior Art

The prior art illustrates various testing methods and apparatus for pressure-type structure. For example, U.S. Pat. No. 2,754,677 illustrates nondestructive testing of thin shells by differential pressure, specifically testing for determining incipient buckling pressures of thin shells subjected to external pressure. Choate et al., in U.S. Pat. No. 2,957,337 illustrate hydrodynamic testing apparatus for use in testing hollow articles by means of pressure applied externally and internally. A hydrodynamic loader is illustrated in U.S. Pat. No. 3,085,422 for simulating sudden dynamic pressure loads. Anderson in U.S. Pat. No. 3,613,435 illustrates a method and system for static testing structures utilizing an earth formation having a test chamber therein for static testing. And, Johnson et al., in U.S. Pat. No. 3,729,980 illustrate a hydrodynamic shock simulator for providing an underwater explosive shock environment for a sonar transducer under test.

SUMMARY OF THE INVENTION

The present invention provides a method and apparatus for experimentally determining response characteristics and strength capacity of submerged hull structures in shallow water.

The method of the present invention provides the steps of submerging the hull structure within a pressure vessel container, floating the pressure vessel container to a predetermined depth for experiencing a full blast effect, spacing the hull structure within the pressure vessel container sufficient to accommodate structural deformations and rigid body motions, filling the pressure vessel container with water, pressurizing the pressure vessel to a pressure corresponding to a predetermined depth, positioning an explosive charge to a stand-off distance from the pressure vessel container, exploding the explosive charge, and measuring and recording the response characteristics and strength capacity data of the submerged hull structure.

The apparatus of the present invention comprises a pressure vessel container containing water, a float means for floating the pressure vessel container at a predetermined depth, a hull structure located within the pressure vessel container filled with air and maintained at atmospheric pressure, and so spaced therein for accommodating structural deformations and rigid body motions, an explosive charge means located at a stand-off distance from the pressure vessel container for exploding and providing shock waves through the pressure vessel container and impinge on the hull structure, pressure means interfaced with the pressure vessel container for pressurizing the pressure vessel container to a pressure corresponding to a predetermined depth, and sensing means located appropriately on the hull structure and the pressure vessel container for measuring and recording the response characteristics and strength capacity data.

OBJECTS OF THE INVENTION

A major object of the present invention is to provide a method and apparatus for experimentally determining response characteristics and strength capacity of submerged hull structures in shallow water, near the shore, and in the vicinity of data measuring, recording, and processing facilities, the characteristics being directly relatable to testing at a real, predetermined depth.

Another object of the present invention is to provide a more controlled environment, less costly and shorter test time for testing and experimentally determining response characteristics and strength capacity of submerged hull structures.

Still another object of the present invention is to provide a simpler, substantially totally controllable, greater time savings, and much less costly method and apparatus for experimentally determining response characteristics and strength capacity of submerged hull structures.

Other objects of the invention will become apparent from the following description and drawings and from the operation itself as hereinafter described.

DESCRIPTION OF THE PREFERRED EMBODIMENT(S)

Figure 1:
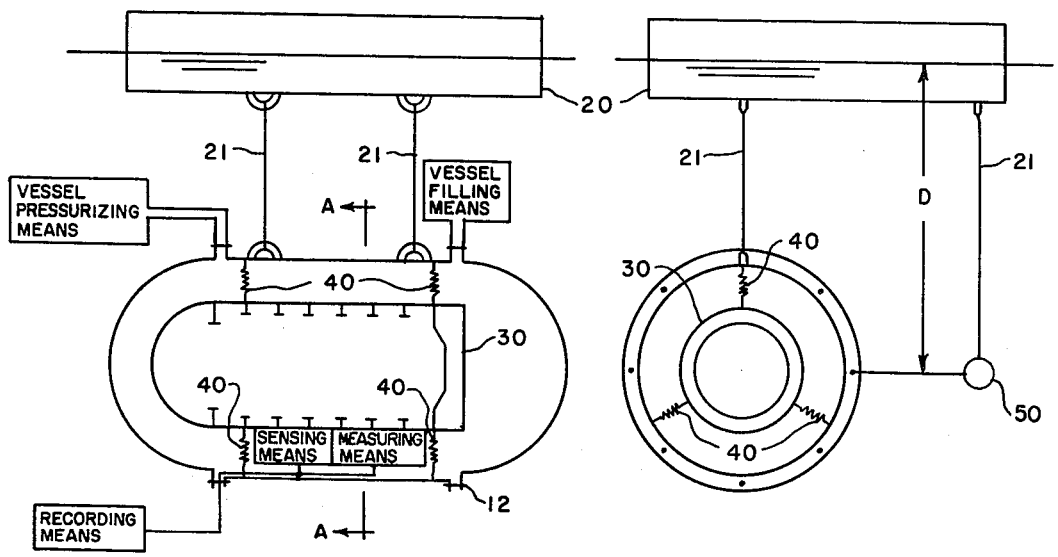
FIG. 1 is a side and end elevational view of an embodiment of the invention.
Figure 2:
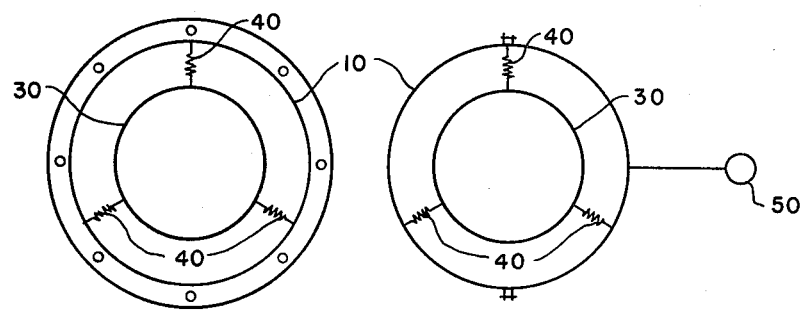
FIG. 2 illustrates an alternative view for testing hemispherical closure bulkheads for use in submarine hulls.

FIG. 1 illustrates a pressure vessel container 10 which is supported by float 20 and cables 21 at a depth D. Depth D is selected operationally to insure that model hull structure 30 will experience the full effect of a stand-off explosive charge 50 blast before shock wave distortion by water surface. Model hull structure 30 is nestled inside pressure vessel container 10 and appropriately spaced therein by spacers 40 of elastic straps or suitable soft spring system for accommodating structural deformations and rigid body motions. The space between pressure vessel container 10 and model hull structure 30 is filled with water and pressurized to a pressure level corresponding to the desired depth. Explosive charge 50 is positioned at a predetermined stand-off distance and exploded. Explosive shock wave passes through water backed pressure vessel container 10 and impinges on model hull structure 30 which is filled with air and maintained at atmospheric pressure. Hull structure 30 responds to the shock wave in the same manner as if hull structure 30 and explosion had occurred at the real test depth. Measuring, recording, and processing facilities interfaced with hull structure 30, and pressure vessel container 10 for receiving test data are not shown, as they are not necessary in depicting the invention. The method and apparatus of this invention are applicable for small and large scale hulls and closure bulkheads. FIG. 2 illustrates an alternative method of this invention for testing hemispherical closure bulkheads for use in submarine hulls.

The method and apparatus of this invention provides for experimentally determining response characteristics and strength capacity of submerged hull structures to be performed in shallow water, near the shore, and in the vicinity of data measuring, recording, and processing facilities. Long lead wires for conveying the measuring data are shortened and the hull structure for testing is more readily accessible for inspection and modifications. Further, tests can be performed in a more controlled environment independent of waves and weather. It also eliminates the need for transporting test and repair equipment to remote deep depth locations.

Obviously many modifications and variations of the present invention are possible in light of the above teachings. It is therefore to be understood that within the scope of the appended claims the invention may be practiced otherwise than as specifically described.

What is claimed is:

1. A method for experimentally determining response characteristics and strength capacity of submerged hull structures in shallow water comprising the steps of:
    submerging the hull structure within a pressure vessel container,
    floating the pressure vessel container to a predetermined depth for experiencing a full blast effect,
    spacing the hull structure within the pressure vessel container sufficient to accommodate structural deformations and rigid body motions,
    filling the pressure vessel container with water,
    pressurizing the pressure vessel to a pressure corresponding to a predetermined depth,
    positioning an explosive charge to a stand-off distance from the pressure vessel container,
    exploding the explosive charge, and
    measuring and recording the response characteristics and strength capacity data of the submerged hull structure.

2. A method for experimentally determining response characteristics and strength capacity of submerged hull structures in shallow water as in claim 1 wherein the hull structure is filled with air and maintained at atmospheric pressure.

3. An experimentally determining response characteristics and strength capacity of a submerged hull structure in shallow water apparatus comprising:
    a pressure vessel container containing water,
    a float means for floating the pressure vessel container at a predetermined depth,
    a hull structure located within the pressure vessel container filled with air and maintained at atmospheric pressure and so spaced therein for accommodating structural deformations and rigid body motions,
    an explosive charge means located at a stand-off distance from the pressure vessel container for exploding and providing shock waves through the pressure vessel container and impinge on the hull structure,
    pressure means interfaced with the pressure vessel container for pressurizing the pressure vessel container to a pressure corresponding to a predetermined depth, and
    sensing means located on the hull structure and the pressure vessel container for measuring and recording the response characteristics and strength capacity data.

* * * * *